US010152494B2

(12) United States Patent
Thomas et al.

(10) Patent No.: US 10,152,494 B2
(45) Date of Patent: Dec. 11, 2018

(54) PROCESS FOR MATCHING PAINT

(71) Applicant: AKZO NOBEL COATINGS INTERNATIONAL B.V., Arnhem (NL)

(72) Inventors: Tom Thomas, Bangalore (IN); Raviraj Rajachandran, Bangalore (IN); Jyotsna Ravi, Bangalore (IN)

(73) Assignee: AKXO NOBEL COATINGS INTERNATIONAL B.V., Arnhem (NL)

( * ) Notice: Subject to any disclaimer, the term of this patent is extended or adjusted under 35 U.S.C. 154(b) by 354 days.

(21) Appl. No.: 14/771,606

(22) PCT Filed: Mar. 4, 2014

(86) PCT No.: PCT/EP2014/054103
§ 371 (c)(1),
(2) Date: Aug. 31, 2015

(87) PCT Pub. No.: WO2014/135503
PCT Pub. Date: Sep. 12, 2014

(65) Prior Publication Data
US 2016/0019208 A1    Jan. 21, 2016

(30) Foreign Application Priority Data

Mar. 7, 2013  (IN) .............................. 990/CHE/2013
Apr. 26, 2013  (EP) ...................................... 13165570

(51) Int. Cl.
*G06F 17/30* (2006.01)
*G01J 3/46* (2006.01)
(Continued)

(52) U.S. Cl.
CPC .......... *G06F 17/3025* (2013.01); *G01J 3/463* (2013.01); *G01J 3/465* (2013.01);
(Continued)

(58) Field of Classification Search
CPC ............ G06F 17/3025; G06F 17/30601; G01J 3/504; G01J 3/465; G01J 3/463; G06Q 10/10
(Continued)

(56) References Cited

U.S. PATENT DOCUMENTS

| 3,690,771 A | 9/1972 | Armstrong, Jr. et al. | |
| 4,479,718 A * | 10/1984 | Alman | G01J 3/504 356/405 |

(Continued)

FOREIGN PATENT DOCUMENTS

| EP | 0484564 A1 | 5/1992 |
| WO | 2008103405 A1 | 8/2008 |
| WO | 2009144222 A1 | 12/2009 |

OTHER PUBLICATIONS

Silva et al., "Color Matching for Metallic Coatings", 2009, 10 pages, accessed online at <www.ece.rutgers.edu/~kdana/Publications/silva2009.pdf> on Sep. 22, 2017.*
Draus et al., "Formulation of Colors Using a Genetic Algorithm", Image Processing & Communication, vol. 17, No. 4, pp. 241-244, first online Apr. 18, 2013. (Year: 2013).*
XP007905525, EPO Official Journal, Notice from the European Patent Office, dated Oct. 1, 2007 concerning business methods, issued in connection with International Application No. PCT/EP2014/054103, pp. 592-593.

*Primary Examiner* — Phuong Thao Cao
(74) *Attorney, Agent, or Firm* — McDonnell Boehnen Hulbert & Berghoff LLP

(57) ABSTRACT

The invention relates to a computer implemented process for matching a paint to the visual appearance properties of a painted substrate surface comprising the steps of a) selecting a potentially matching first candidate paint based on a first paint recipe comprising one or more color and/or effect imparting toners, b) applying the first candidate paint to a test panel to obtain a first painted test panel c) visually comparing the appearance properties of the painted substrate surface and the first painted test panel under more than one viewing angle, wherein the visual comparison comprises c1) selecting a visual appearance category wherein the appearance of the painted test panel most prominently deviates from the painted substrate, wherein the categories are selected from a number of pre-defined visual appearance categories displayed on an output device of a computer, c2) inputting the selected visual appearance category in an input device of the computer, c3) visually determining the visual appearance difference of the painted test panel and the painted substrate in the selected appearance category, d) entering the determined visual appearance difference in an input device of the computer, e) optionally, entering only the types of toners of the candidate paint in an input device of the computer, f) providing a paint recipe modification advice consisting an advice of increasing or reducing one or more of the toners in the recipe, or adding an additional toner to the recipe or, on an output device of the computer, wherein the computer software provides the modification advice on the basis of i) the entered visual appearance difference and ii) a database in which only visually determined appearance properties of available toners under two or more viewing angles are stored, with the aim to minimize the appearance difference, g) preparing a second candidate paint based on the recipe modification advice, h) applying the second candidate paint to a test panel to obtain a second painted test panel, and i) repeating steps c) to h) until the visual comparison in step c) indicates that the candidate paint sufficiently matches the appearance properties of the painted substrate surface.

18 Claims, No Drawings

(51) Int. Cl.
*G06Q 10/10* (2012.01)
*G01J 3/50* (2006.01)

(52) U.S. Cl.
CPC ........ *G01J 3/504* (2013.01); *G06F 17/30601* (2013.01); *G06Q 10/10* (2013.01)

(58) Field of Classification Search
USPC ........................................................ 707/740
See application file for complete search history.

(56) References Cited

U.S. PATENT DOCUMENTS

| | | | | |
|---|---|---|---|---|
| 4,917,495 | A * | 4/1990 | Steenhoek | G01J 3/0251 356/328 |
| 4,977,522 | A * | 12/1990 | David | B01F 13/1055 356/408 |
| 6,522,977 | B2 * | 2/2003 | Corrigan | G01J 3/02 356/402 |
| 6,539,325 | B1 * | 3/2003 | Numata | G01J 3/46 356/402 |
| 6,606,167 | B1 | 8/2003 | Rees et al. | |
| 6,622,064 | B2 | 9/2003 | Bartholomew et al. | |
| 6,714,924 | B1 * | 3/2004 | McClanahan | B44D 3/003 382/156 |
| 6,717,673 | B1 * | 4/2004 | Janssen | G01J 3/46 356/402 |
| 6,804,390 | B2 * | 10/2004 | McClanahan | G01J 3/46 382/156 |
| 6,842,654 | B2 * | 1/2005 | Lawn | G06Q 30/02 382/165 |
| 6,892,194 | B2 * | 5/2005 | McClanahan | G01J 3/52 706/18 |
| 6,982,108 | B2 * | 1/2006 | Janssen | B44F 1/06 206/81 |
| 7,145,656 | B2 * | 12/2006 | Rodrigues | G06T 11/001 356/402 |
| 7,184,170 | B2 * | 2/2007 | Agarwal | G01J 3/46 358/1.9 |
| 7,194,361 | B2 * | 3/2007 | Corrigan | G01J 3/46 356/402 |
| 7,320,811 | B2 * | 1/2008 | Doyle | B05D 5/005 427/140 |
| 7,337,162 | B2 * | 2/2008 | Lewis | G01J 3/02 |
| 7,466,415 | B2 * | 12/2008 | Gibson | B01F 13/1055 356/402 |
| 7,737,991 | B2 * | 6/2010 | McClanahan | G01J 3/46 345/594 |
| 8,760,654 | B2 * | 6/2014 | Kettler | G01J 3/46 356/402 |
| 2001/0041966 | A1 * | 11/2001 | Corrigan | G01J 3/02 702/32 |
| 2002/0042842 | A1 * | 4/2002 | Lawn | G06Q 30/02 709/246 |
| 2002/0106121 | A1 * | 8/2002 | McClanahan | G01J 3/46 382/156 |
| 2002/0161530 | A1 * | 10/2002 | Corrigan | G01J 3/46 702/32 |
| 2003/0048942 | A1 * | 3/2003 | Masuda | G06F 17/3025 382/165 |
| 2003/0163262 | A1 * | 8/2003 | Corrigan | G01J 3/46 702/32 |
| 2003/0180442 | A1 * | 9/2003 | Hopson | B05B 12/1418 427/8 |
| 2003/0184772 | A1 * | 10/2003 | Agarwal | G01J 3/46 358/1.9 |
| 2004/0067350 | A1 * | 4/2004 | Janssen | B44F 1/06 428/212 |
| 2004/0073526 | A1 * | 4/2004 | McClanahan | B44D 3/003 706/15 |
| 2005/0083529 | A1 * | 4/2005 | Vogel | G01N 21/55 356/445 |
| 2005/0128484 | A1 * | 6/2005 | Rodrigues | G06T 11/001 356/402 |
| 2006/0181707 | A1 * | 8/2006 | Gibson | B01F 13/1055 356/402 |
| 2006/0183458 | A1 * | 8/2006 | Sena | C09D 7/14 455/403 |
| 2007/0003691 | A1 * | 1/2007 | Rodrigues | B05D 5/005 427/140 |
| 2007/0250273 | A1 * | 10/2007 | De Haas | G01J 3/46 702/22 |
| 2007/0273890 | A1 * | 11/2007 | Njo | G01J 3/0251 356/600 |
| 2007/0292608 | A1 * | 12/2007 | Rodrigues | G01J 3/46 427/140 |
| 2008/0052023 | A1 * | 2/2008 | Kettler | G01J 3/46 702/82 |
| 2008/0113167 | A1 * | 5/2008 | Henry | G01J 3/504 428/212 |
| 2008/0291449 | A1 * | 11/2008 | Rodrigues | G01J 3/46 356/402 |
| 2008/0314500 | A1 | 12/2008 | Boers et al. | |
| 2009/0157212 | A1 * | 6/2009 | McClanahan | G01J 3/46 700/107 |
| 2009/0213379 | A1 * | 8/2009 | Carroll | G01J 3/46 356/405 |
| 2009/0274827 | A1 * | 11/2009 | Anderson | G06Q 10/06 427/8 |
| 2009/0276254 | A1 * | 11/2009 | Anderson | G06Q 10/20 705/305 |
| 2009/0295823 | A1 * | 12/2009 | Henry | G01J 3/46 345/593 |
| 2011/0013206 | A1 * | 1/2011 | Mestha | H04N 1/60 358/1.9 |
| 2011/0026053 | A1 * | 2/2011 | Gil | H04N 1/54 358/1.9 |
| 2011/0085169 | A1 * | 4/2011 | Craighead | G01J 3/46 356/425 |
| 2011/0160892 | A1 * | 6/2011 | Kettler | G01J 3/46 700/105 |
| 2012/0046987 | A1 * | 2/2012 | Lee | G01J 3/46 705/7.21 |
| 2012/0170836 | A1 * | 7/2012 | Henry | G01J 3/52 382/162 |
| 2012/0206728 | A1 * | 8/2012 | Meijer | G01J 3/463 356/405 |
| 2013/0071015 | A1 * | 3/2013 | Rodrigues | B05D 5/005 382/162 |
| 2014/0186633 | A1 * | 7/2014 | Henry | B32B 5/00 428/411.1 |
| 2015/0120492 | A1 * | 4/2015 | Somerville | G06Q 30/0621 705/26.5 |
| 2016/0019208 | A1 * | 1/2016 | Thomas | G01J 3/504 707/740 |

* cited by examiner

PROCESS FOR MATCHING PAINT

REFERENCE TO RELATED APPLICATIONS

This application is the U.S. National Phase of PCT/EP2014/054103, filed on Mar. 4, 2014, which is incorporated herein by reference it its entirety, and which claims the benefit of IN Application No. 990/CHE/2013, filed on Mar. 7, 2013, and EP Application No. 13165570.6, filed on Apr. 26, 2013.

The invention relates to a computer-implemented process for matching a paint to the visual appearance properties of a painted substrate surface.

The matching of paint to the visual appearance properties of a painted substrate is particularly important for repair paints, specifically in the repair painting of automobiles. Generally, a first candidate recipe for a matching repair paint is retrieved from a recipe database. Coloured automobile repair paints are typically prepared locally by mixing a limited number of colour and/or effect imparting pigmented toners provided by paint manufacturers. Typically, 15 to 40 different toners are provided to match all possible colours encountered in the field. Individual toners may contain a single pigment, or a combination of two or more pigments. Most paint colours can be matched by mixing 3 to 6, or more toners. Variations in the visual properties of painted surfaces may occur, even if it concerns the same colour name or colour code. Such differences may occur due to small variations in the process conditions, for example at different automobile manufacturing sites, or due to batch-to-batch variations of paints or the ingredients thereof, or due to aging of the coating, for example by environmental influences, such as sunlight, rain, or industrial pollutants. Although such differences may be unnoticeable on separate vehicles, when they are present on one body panel or on adjacent body panels, such as a hood and a fender, of the same vehicle, the differences can be visibly perceptible.

Due to these colour variations, a first candidate recipe for a matching repair paint often does not lead to a repair paint having a sufficient match of visual properties, and it is generally difficult to attain an excellent colour matching in an automobile body repair shop.

WO 2009/144222 describes a method of determination of a matching variant of a standard colour of a repair paint matching the colour of an object to be repaired. The best matching variant is suitably determined using a database wherein sets of deviations for predetermined visual properties are linked to a specific variant of a standard colour. In one embodiment, the database is implemented on an electronic data storage and processing unit, usually a computer system.

The method described in this document uses a limited number of specific variant recipes of a standard colour recipe. Repair paint colour deviations which are caused by variable factors, such as environmental influences of the object to be repaired, weighing errors during repair paint preparation, or insufficient stirring of toners to compensate pigment settling in toners, cannot be compensated and corrected with the known method.

The invention therefore seeks to provide a process for matching a paint which does not exhibit the above-mentioned drawbacks. The process should be easy to use also by users who are less experienced in the field of colour matching. Likewise, the process should not rely on expensive or sensitive equipment, such as spectrophotometers. The process should ideally mimic the skills of an experienced colour matching expert.

The invention now provides a computer implemented process for matching a paint to the visual appearance properties of a painted substrate surface comprising the steps of
a) selecting a potentially matching first candidate paint based on a first paint recipe comprising one or more colour and/or effect imparting toners,
b) applying the first candidate paint to a test panel to obtain a first painted test panel
c) visually comparing the appearance properties of the painted substrate surface and the first painted test panel under more than one viewing angle, wherein the visual comparison comprises
   c1) selecting a visual appearance category wherein the appearance of the painted test panel most prominently deviates from the painted substrate, wherein the categories are selected from a number of pre-defined visual appearance categories displayed on an output device of a computer
   c2) inputting the selected visual appearance category in an input device of the computer,
   c3) visually determining the visual appearance difference of the painted test panel and the painted substrate in the selected appearance category,
d) entering the determined visual appearance difference in an input device of the computer,
e) optionally, entering only the types of toners of the candidate paint in an input device of the computer
f) providing a paint recipe modification advice consisting of an advice of increasing or reducing one or more of the toners in the recipe, or adding an additional toner to the recipe or, on an output device of the computer,
wherein the computer software provides the modification advice on the basis of
   i) the entered visual appearance difference and
   ii) a database in which only visually determined appearance properties of available toners under two or more viewing angles are stored,
with the aim to minimize the appearance difference,
g) preparing a second candidate paint based on the recipe modification advice,
h) applying the second candidate paint to a test panel to obtain a second painted test panel, and
i) repeating steps c) to h) until the visual comparison in step c) indicates that the candidate paint sufficiently matches the appearance properties of the painted substrate surface.

The selection of the first candidate recipe may be based on a colour name, a colour number or colour code. Alternatively, the first candidate recipe may also be obtained by visual comparison of the painted substrate surface to be matched with colour chips coated with paints of known recipes. In a still further embodiment, the first candidate may be selected based on colourimetric data obtained with a colour measuring instrument, such as a spectrophotometer. In the case of effect coatings, also texture properties, coarseness, glints or sparkle may be taken into account. The paint recipe generally comprises one or more colour and/or effect imparting toners, which have pre-defined colour or effect imparting properties. The paint recipe may further comprise binder and diluent modules, and optionally additive modules. The paint recipe also includes indications of the volume or weight ratios of the individual components to be mixed, and optionally the order in which these components should be mixed.

If the first candidate paint is not available on stock, it may be prepared according to the recipe by mixing the required components.

The first candidate is then applied to a test panel. The test panel may be made of metal. Suitably, the test panel is made of a similar material than the painted substrate. The test panel may also have a primer layer which is the same or similar to the primer layer which may be present on the painted substrate. The first candidate paint is suitably applied to the test panel under the same or substantially the same conditions, under which the substrate would be painted with a matching paint. Suitably, the same application technique, such as a spraying, would be used for the test panel as for the actual painting job.

After application of the first candidate paint to the test panel, the paint is suitably allowed to dry at least partially.

Subsequently, the visual appearance properties of the test panel painted with the first candidate paint are compared to the painted substrate surface. This comparison is carried out visually by the user under more than one viewing angle.

The comparison comprises the step of selecting a visual appearance category wherein the appearance of the painted test panel most prominently deviates from the painted substrate. The category is selected from a number of pre-defined visual appearance categories. The visual appearance categories are suitably displayed on the output device of a computer. The computer may be a desktop computer, a laptop computer, both typically having an electronic display screen as output device, and a keyboard and/or mouse as input devices. Alternatively, the computer may be a mobile device, such as a tablet computer having a touch screen, or a so called smart phone. The computer is suitably connected to a data network, such as a local area network or the internet via wired or wireless communication lines. Examples of pre-defined visual appearance categories include colour, lightness/darkness, saturation, gloss, as well as texture properties such as coarseness, graininess, glints, or sparkle.

The appearance category wherein the most prominent visual difference is perceived is selected, and entered into the computer via an input device.

Subsequently, the appearance difference in the selected category is determined visually. Visual determination of the appearance difference implies that the determination is carried out using the human eye, which leads to a qualitative determination of the difference, in contrast to numerical values which could be obtained using optical instruments for measurement. Generally, the direction of the appearance difference will be determined, i.e. coarser, finer, lighter, darker, more red, less red, and the like. Additionally, it is possible to determine in a semi-quantitative way the magnitude of the difference.

In one embodiment, pre-defined visual appearance differences are presented on an output device of the computer, and the entered visual appearance difference is selected from one of the presented pre-defined appearance differences.

The determined visual appearance difference in the selected category is entered into the computer via an input device. In addition to the visual appearance difference, also the types of toners of the candidate paint are entered into the computer via an input device. It is sufficient to enter the type of the toners only. In case of a plurality of toners, the relative amount of the different toners is not required. In the event that recipe for the candidate paint has been provided by the computer system, the type of toners may already be available to the computer or it may be present in a database. In this case, it is not required to manually enter the types of toners of the candidate paint.

Based on the information on appearance difference and types of toners present in the paint recipe, the computer software provides a paint recipe modification advice. The advice is suitably displayed on an output device of the computer, for example on a display screen. The paint recipe modification advice consists of an advice to increase or reduce the amount of one or more of the toners in the paint recipe, or to add an additional toner to the recipe.

The computer software provides the modification advice on the basis of the entered visual appearance difference, the toners present in the paint recipe, and a database in which only visually determined appearance properties of available toners under two or more viewing angles are stored.

There may be two or more toners in a product line which fall into the same colour group, i.e. toners which produce the same basic colour, for example red. In that case, the database also contains the visual levels of other colour groups of the individual toners belonging to the same colour group, and ranks the toners accordingly. For example, various red toners would be ranked based on the visual yellow and blue levels compared to each other.

For generation of the advice, suitable algorithms are used. As an example, a difference in coarseness is related to metallic toners present in the recipe, and colour difference is related to the solid colour toners present in the recipe. If, for example, the candidate paint is finer in texture than the reference, the software will provide a paint recipe modification advice in the sense that a metallic toner is added which is known to provide a high coarseness. Similarly, in the case of colour difference, based on the colour differences seen in different viewing angles (eg. reddish in gloss, yellowish red in face, yellowish red in flop) depending on the solid toners and their characteristic visual properties in different viewing angles, an advice is displayed as to which solid toner present in the recipe has to be adjusted or which compensating toner has to be added. For generation of the modification advice, the toners present in the recipe are taken into account, as well as known interactions between appearance properties of the toners.

If two or more toners from the same colour group are present, the method looks into the ranking system provided based on visual properties and suggests the best option.

For example, when the visual comparison of a blue test panel indicates that that the original is more reddish blue, the modification advice depends on the toners present. The software will not only propose to add or increase red toners, but other toners which in combination with blue can give a redder direction will be taken into account, such as violet.

For effect colours having viewing angle dependent visual properties, it is generally preferred that the generation of the paint recipe modification advice also uses viewing angle dependent visual properties of the toners stored in the database. The tool suggests the best approach to minimize visual properties differences considering the colour difference under all available viewing angles.

The process of the invention is of particular advantage for embodiments wherein the first paint recipe comprises three or more different colour and/or effect imparting toners. As mentioned above, repair paint recipes typically contain 4, or 5, or even 6 or more different individual toners to match the visual appearance properties of the original painted substrate. Generally, an inexperienced operator will find it more difficult to predict a suitable paint recipe modification based on intuition when a higher number of toners is used in the recipe, and even more so if two or more toners from the same colour group are present, for example two different red toners.

The database can be located on the location where the computer of the user is located. Alternatively, the database may be located on a central computer or data server, which is connected to the user computer by a wired or wireless data communication line. The tinting advice is given in such a way as to minimize the visual appearance difference.

In one embodiment, the database wherein visually determined appearance properties of available toners are stored also contains visually determined appearance properties for two or more application conditions. In this case, an application advice may also be provided to the user, for example an advice to user a different spraying technique for application of the paint.

Using the paint recipe modification advice, the user prepares a second candidate paint. Depending on the advice, it may be required to prepare and entire new batch of paint. If the advice is to increase the proportion of a specific toner, or to add a further toner to the recipe, it may also be possible to modify the existing paint sample of the candidate paint and to add one or more toners to that sample in order to prepare the second candidate paint. The second candidate paint is again applied to a test panel to obtain second painted test panel. This panel is again compared to the painted substrate surface to be repaired. If the difference in visual appearance properties is sufficiently small, the candidate paint can be applied to at least a part of the painted substrate surface. If the difference in visual appearance properties is too large to be considered a sufficient match, the preceding steps are repeated until a candidate paint is obtained which sufficiently matches the visual appearance of the painted substrate.

The painted substrate may be any painted substrate which needs a repair or refinishing with a matching paint. However, the process is particularly for finding a repair or refinishing coatings for transportation vehicles, such as trucks, buses, trains, airplanes, and passenger cars. Repair coating of automobiles is a preferred are, where the process can be used.

The invention also relates to a computer system for carrying out the invention. The computer system comprises a central processing unit, at least an input and output device and has access to a database in which only visually determined appearance properties of available toners under two or more viewing angles are stored, and the computer system is programmed to carry out the computer implement process of the invention.

The invention claimed is:

1. A computer implemented process for matching a paint to visual appearance properties of a painted substrate surface comprising
   a) selecting a potentially matching first candidate paint based on a first paint recipe comprising one or more color and/or effect imparting toners,
   b) applying the potentially matching first candidate paint to a test panel to obtain a first painted test panel,
   c) visually comparing the visual appearance properties of the painted substrate surface and the first painted test panel under more than one viewing angle, wherein the visual comparison comprises
      c1) selecting a visual appearance category wherein the appearance of the first painted test panel most prominently deviates from the painted substrate surface, wherein the visual appearance category is selected from a number of pre-defined visual appearance categories displayed on an output device of a computer,
      c2) inputting the selected visual appearance category in an input device of the computer,
      c3) visually determining a visual appearance difference of the first painted test panel and the painted substrate surface in the selected visual appearance category,
   d) entering the determined visual appearance difference in an input device of the computer, wherein the entered visual appearance difference is selected from one of pre-defined visual appearance differences presented on an output device of the computer,
   e) optionally, entering only the types of toners of the first candidate paint or, if one or more modified candidate paints were previously generated in g) (below), the modified candidate paint generated in g) in an input device of the computer,
   f) displaying on an output device of the computer a paint recipe modification advice consisting of advice for (1) increasing or reducing one or more of the toners or (2) adding an additional toner to the first paint recipe or, if one or more modified candidate paints were previously generated in g) (below), the modified recipe, wherein software on the computer provides the paint recipe modification advice on the basis of
      i) the entered visual appearance difference, and
      ii) a database in which only visually determined visual appearance properties of available toners under two or more viewing angles are stored,
   with the aim to minimize the visual appearance difference entered in the input device in d),
   g) preparing a modified candidate paint based on the paint recipe modification advice,
   h) applying the modified candidate paint to a test panel to obtain a modified painted test panel, and
   i) visually determining the visual appearance difference of the modified painted test panel and the painted substrate surface in the selected visual appearance category by performing the visual comparison according to c),
   j) repeating d)-i) until the visual comparison in c) indicates that the modified candidate paint sufficiently matches the visual appearance properties of the painted substrate surface.

2. The process according to claim 1, wherein the candidate paint that sufficiently matches the visual appearance properties of the painted substrate surface is applied to at least a part of the painted substrate surface.

3. The process according to claim 1, wherein the painted substrate surface is an automobile surface.

4. The process according to claim 1, wherein the first paint recipe comprises at least 3 color and/or effect imparting toners.

5. The process according to claim 1, wherein the database where visually determined appearance properties of available toners are stored also contains visually determined appearance properties for two or more application conditions, and wherein in f) an application advice is also provided.

6. The process according to claim 1, wherein the pre-defined visual appearance categories include at least color, coarseness, and gloss.

7. The process according to claim 1, wherein the database in which only visually determined appearance properties of available toners under two or more viewing angles are stored is located on a remote computer.

8. The process according to claim 1, wherein for the generation of the paint recipe modification advice, the toners present in the recipe and known interactions between appearance properties of the toners are taken into account.

9. The process according to claim 1, wherein for the generation of the paint recipe modification advice viewing angle dependent visual properties of the toners stored in the database are taken into account.

10. The process according to claim 1, wherein the painted substrate surface is an automobile surface, and the process repairs any damage to the repair coating of the automobile surface.

11. The process according to claim 2, wherein the painted substrate surface is an automobile surface.

12. The process according to claim 2, wherein the first paint recipe comprises at least 3 color and/or effect imparting toners.

13. The process according to claim 2, wherein the database wherein visually determined appearance properties of available toners are stored also contains visually determined appearance properties for two or more application conditions, and wherein in f) an application advice is also provided.

14. The process according to claim 2, wherein the pre-defined visual appearance categories include at least color, coarseness, and gloss.

15. The process according to claim 2, wherein the database in which only visually determined appearance properties of available toners under two or more viewing angles are stored is located on a remote computer.

16. The process according to claim 2, wherein for the generation of the paint recipe modification advice, the toners present in the recipe and known interactions between appearance properties of the toners are taken into account.

17. The process according to claim 2, wherein for the generation of the paint recipe modification advice viewing angle dependent visual properties of the toners stored in the database are taken into account.

18. A computer system comprising a central processing unit, an input device, and a display screen, the computer system being configured to perform the process comprising
(a) a user selects a potentially matching first candidate paint based on a first paint recipe comprising one or more color and/or effect imparting toners,
(b) the user applies the potentially matching first candidate paint to a test panel to obtain a first painted test panel,
(c) the user compares visual appearance properties of the painted substrate surface and the first painted test panel under more than one viewing angle, wherein the visual comparison comprises
  c1) the user selecting a visual appearance category wherein the selected appearance of the first painted test panel most prominently deviates from the painted substrate surface, wherein the visual appearance category is selected from a number of pre-defined visual appearance categories displayed on the display screen of the computer system,
  c2) the user inputting the selected visual appearance category in the input device of the computer system,
  c3) the user visually determining a visual appearance difference of the first painted test panel and the painted substrate surface in the selected visual appearance category,
d) the user enters the determined visual appearance difference in the input device of the computer system, wherein the entered visual appearance difference is selected from one of pre-defined visual appearance differences presented on the display screen of the compute system,
e) the user, optionally, enters only the types of toners of the first candidate paint or, if one or more modified candidate paints were previously generated in g) (below), the modified candidate paint generated in g) in an input device of the computer,
f) displaying on the display screen a paint recipe modification advice,
g) the user prepares a modified candidate paint based on the paint recipe modification advice,
h) the user applies the modified candidate paint to a test panel to obtain a modified painted test panel, and
i) the user visually determines the visual appearance difference of the modified painted test panel and the painted substrate surface in the selected visual appearance category by performing the visual comparison according to c),
j) the user repeats d)-i) until the visual comparison in c) indicates that the modified candidate paint sufficiently matches the visual appearance properties of the painted substrate surface,
wherein the paint recipe modification advice consists of advice for (1) increasing or reducing one or more of the toners or (2) adding an additional toner to the first paint recipe or, if one or more modified candidate paints were previously generated in g), the modified recipe, wherein software on the computer system provides the paint recipe modification advice on the basis of
  i) the entered visual appearance difference, and
  ii) a database in which only visually determined visual appearance properties of available toners under two or more viewing angles are stored,
with the aim to minimize the visual appearance difference entered in the input device in d).

* * * * *